United States Patent
Sakurai

(10) Patent No.: US 8,547,586 B2
(45) Date of Patent: Oct. 1, 2013

(54) SCANNER DEVICE UTILIZING AN INTERNAL STORAGE UNIT AND AN EXTERNAL STORAGE UNIT CORRESPONDING TO HEADER INFORMATION

(75) Inventor: Kunihiko Sakurai, Gifu (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 253 days.

(21) Appl. No.: 13/185,905

(22) Filed: Jul. 19, 2011

(65) Prior Publication Data

US 2012/0019868 A1 Jan. 26, 2012

(30) Foreign Application Priority Data

Jul. 20, 2010 (JP) .................................. 2010-162706

(51) Int. Cl.
*G06K 15/00* (2006.01)
(52) U.S. Cl.
USPC .......... 358/1.16; 358/1.9; 358/404; 358/448; 358/449
(58) Field of Classification Search
USPC .................... 358/1.1–3.29, 404, 448, 449
See application file for complete search history.

(56) References Cited

U.S. PATENT DOCUMENTS

| 2002/0084301 A1 | 7/2002 | Murgatroyd | |
|---|---|---|---|
| 2008/0012972 A1* | 1/2008 | Hirai | 348/294 |
| 2008/0256105 A1* | 10/2008 | Nogawa et al. | 707/101 |

FOREIGN PATENT DOCUMENTS

| JP | 2002-515141 | 5/2002 |
|---|---|---|
| JP | 2007-214715 | 8/2007 |
| JP | 2008-141692 | 6/2008 |

OTHER PUBLICATIONS

Abstract of corresponding International Publication No. WO 9854608 A1, dated Dec. 3, 1998.

* cited by examiner

*Primary Examiner* — Benny Q Tieu
*Assistant Examiner* — Marcellus Augustin
(74) *Attorney, Agent, or Firm* — Scully, Scott, Murphy & Presser, PC

(57) ABSTRACT

A scanner device may create original data in an internal storage unit. The original data may include header information and actual image data representing a scan target object. The header information may include a first value as size information. The size information may indicate a size of image data corresponding to a scanning direction. In a case where the size of the actual image data is smaller than the first value, the original data may further include specific image data such that the size of entire image data including the actual image data and the specific image data is identical to the first value. The scanner device may calculate a digest value by utilizing the original data so as to create purpose data in an external storage unit by utilizing the original data and the digest value.

11 Claims, 6 Drawing Sheets

SCANNER DEVICE UTILIZING AN INTERNAL STORAGE UNIT AND AN EXTERNAL STORAGE UNIT CORRESPONDING TO HEADER INFORMATION

CROSS-REFERENCE TO RELATED APPLICATION(S)

This application claims priority to Japanese Patent Application No. 2010-162706, filed on Jul. 20, 2010, the contents of which are hereby incorporated by reference into the present application.

TECHNICAL FIELD

The present application discloses technology for creating original data representing a scan target object.

DESCRIPTION OF RELATED ART

A scanner device for creating PDF document data using scanned paper information is known. This scanner device creates a hash value from the PDF document data and creates a time stamp token from the hash value. Also, this scanner device creates document data with the time stamp by embedding the time stamp token into the document data. Note that the PDF document data includes JPEG data. The JPEG data normally includes header information with height information, and image data. The height information indicates the size of the image data corresponding to a scanning direction.

BRIEF SUMMARY

The present application provides technology capable of rapidly calculating a digest value even in a case where a storage capacity of an internal storage unit of a scanner device is relatively small.

One technique disclosed in the present application is a scanner device utilizing an external storage unit. The scanner device may comprise an internal storage unit, an original data creation unit, and a purpose data creation unit. The original data creation unit may be configured to create original data representing M pieces of scan target objects in the internal storage unit in a case where the M pieces of the scan target objects are scanned. The M may be an integer equal to one or more. The purpose data creation unit may be configured to calculate a digest value by utilizing the original data so as to create purpose data for M pages representing the M pieces of the scan target objects in the external storage unit by utilizing the original data and the digest value.

The original data creation unit may comprise a header information creation unit, an actual image data creation unit, and a specific image data creation unit. The header information creation unit may be configured to create header information in the internal storage unit in a case where target original data representing one piece of a scan target object included in the M pieces of the scan target objects is to be created. The header information may include a predetermined first value as a first type of size information. The first type of size information may indicate a first type of size which is a size of image data corresponding to a scanning direction. The actual image data creation unit may be configured to create actual image data representing the one piece of the scan target object in the internal storage unit. The specific image data creation unit may be configured to create specific image data in the internal storage unit in a first case where the first type of size of the actual image data is smaller than the first value such that the first type of size of entire image data including both of the actual image data and the specific image data is identical to the first value. The purpose data creation unit may comprise a calculation unit and a writing unit. The calculation unit may be configured to perform, each time each of a plurality of first partial data is created in the internal storage unit, a calculation process for calculating the digest value by utilizing the first partial data in the first case. The plurality of first partial data may constitute a first type of the target original data including the header information and the entire image data. The writing unit may be configured to sequentially write each of the plurality of first partial data in the external storage unit in the first case.

One technique disclosed in the present application is a scanner device. The scanner device may comprise an original data creation unit and a calculation unit. The original data creation unit may be configured to create original data including header information and actual image data representing a scan target object in a case where the scan target object is scanned. The header information may include a predetermined first value as a first type of size information. The first type of size information may indicate a first type of size which is a size of image data corresponding to a scanning direction. The calculation unit may be configured to sequentially perform a calculation process for calculating a digest value by sequentially utilizing each of a plurality of partial data constituting the original data. In a case where the first type of size of the actual image data is smaller than the first value, the original data creation unit may compensate the actual image data with specific image data such that the first type of size of compensated image data is identical to the first value so as to create the original data further including the specific image data.

A control method, computer program and computer-readable storage medium storing the computer program are also newly useful in realizing the scanner device described above.

EMBODIMENT

First Embodiment (System Configuration)

Figure 1:
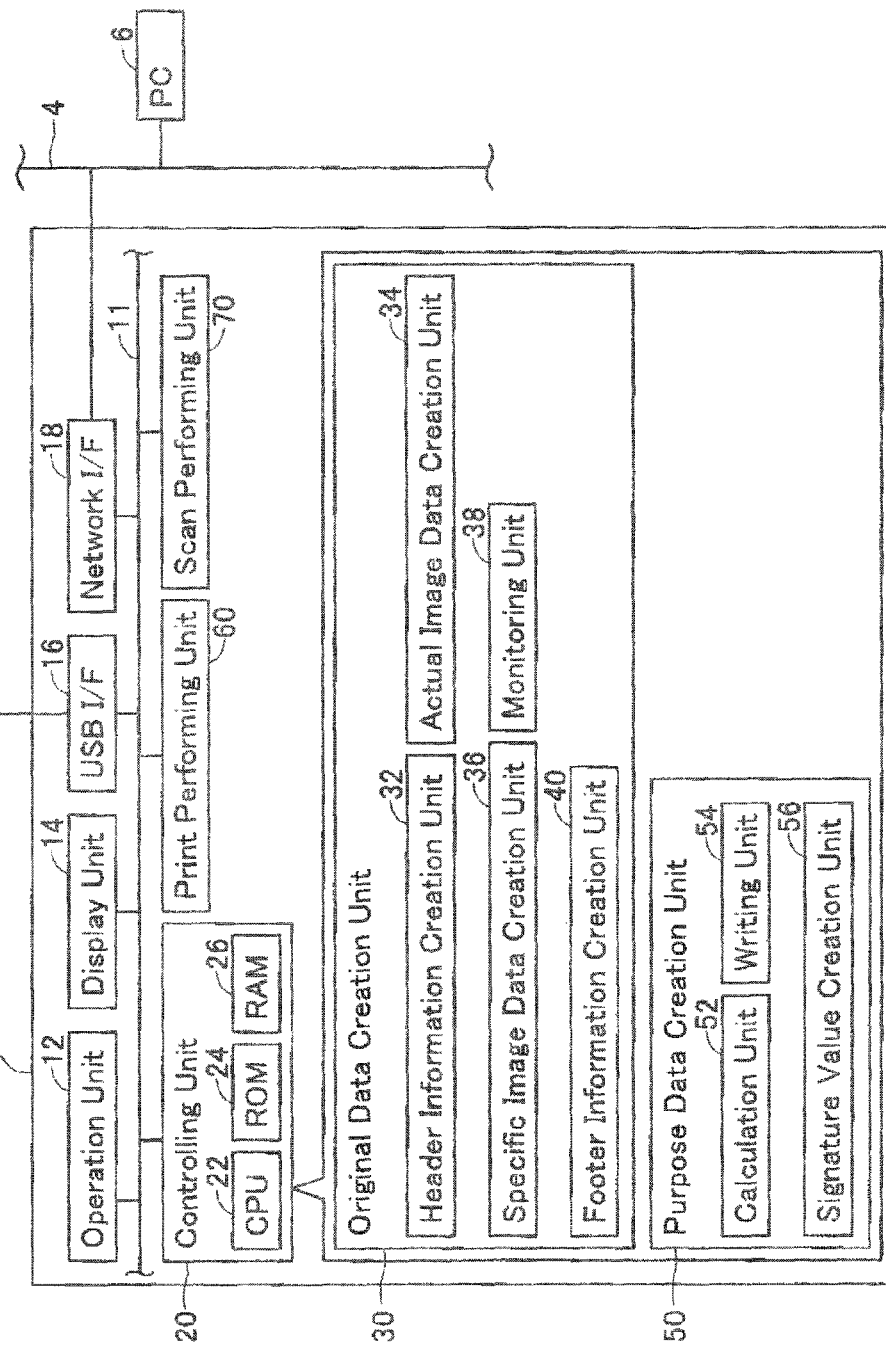
FIG. 1 shows a configuration of a communication system.

As shown in FIG. 1, a communication system 2 has a PC 6 and a multi-function device 10, which is a peripheral equipment of the PC 6. The PC 6 and the multi-function device 10 can mutually communicate through a network cable 4.

(Configuration of the Multi-function Device 10)

The multi-function device 10 is capable of performing multiple functions including a print function and a scan function. The multi-function device 10 has an operation unit 12, a display unit 14, a USB interface 16, a network interface 18, a control unit 20, a print performing unit 60, and a scan performing unit 70. Each of the units 12 to 20, 60, and 70 is connected to a bus 11. The operation unit 12 is constituted by a plurality of keys. A user can input a variety of information into the multi-function device 10 by operating the operation unit 12. The display unit 14 is a display for displaying the variety of information. The USB interface 16 is mounted with a USB memory 8, which is an external memory portable by the user. The network cable 4 is connected to the network interface 18.

The control unit 20 has a CPU 22, a ROM 24, and a RAM 26. The CPU 22 performs a variety of processes according to a program stored in the ROM 24. The functions of units such as an original data creation unit 30 and purpose data creation unit 50 are realized by the CPU 22 performing the processes according to the program. Note that the original data creation unit 30 has units 32 to 40. The purpose data creation unit 50 has units 52 to 56. The RAM 26, a main memory that the CPU 22 can directly access, is for storing a variety of data acquired or created by the control unit 20. Note that the RAM 26 has a memory capacity that is larger than a memory capacity for storing JPEG (Joint Photographic Experts Group) data for one page, which has a maximum data size. The "JPEG data for one page, which has a maximum data size" means JPEG data that is created by the scan performing unit 70 scanning a scan target object for one page at a maximum possible scanning resolution, the scan target object having a maximum scannable height and width. The "height" and "width" of the scan target object will be described hereinbelow in detail. In another embodiment, the RAM 26 may have a memory capacity that is smaller than the memory capacity for storing the JPEG data for one page, which has the maximum data size. Note that the storage capacity of the RAM 26 is smaller than the storage capacity of the USB memory 8.

The print performing unit 60 has an inkjet type, a laser type or other type of printing mechanism. The scan performing unit 70 has a transparent plate, an auto document feeder (ADF), and a scanning mechanism. The scanning mechanism has a plurality of image sensors aligns along a first direction. Each of the image sensors may be a CCD image sensor (Charge Coupled Device Image Sensor) or a CIS (Contact Image Sensor). The scanning mechanism is capable of moving in a second direction that is perpendicular to the direction in which the plurality of image sensors aligns (the first direction). The scanning mechanism can scan the scan target object (e.g., two pieces of original documents 72, 74 described in FIG. 2) placed on the transparent plate, by moving the plurality of image sensors in the second direction. Moreover, the scanning mechanism, when in a stationary state thereof, can scan the original documents 72, 74 that is fed in the second direction by the auto document feeder. Hereinafter, scanning the original documents 72, 74 placed on the transparent plate is called "moving scan," and scanning the original documents 72, 74 fed by the auto document feeder is called "stationary scan."

In either the moving scan or the stationary scan, the width direction of the scan target object is the direction in which the plurality of image sensors constituting the scanning mechanism aligns (the first direction). In the case of the moving scan, the height direction of the scan target object is the direction of movement of the scanning mechanism (the second direction). In the case of the stationary scan, the height direction of the scan target object is the direction in which the original document is fed by the auto document feeder (the second direction).

Figure 2:
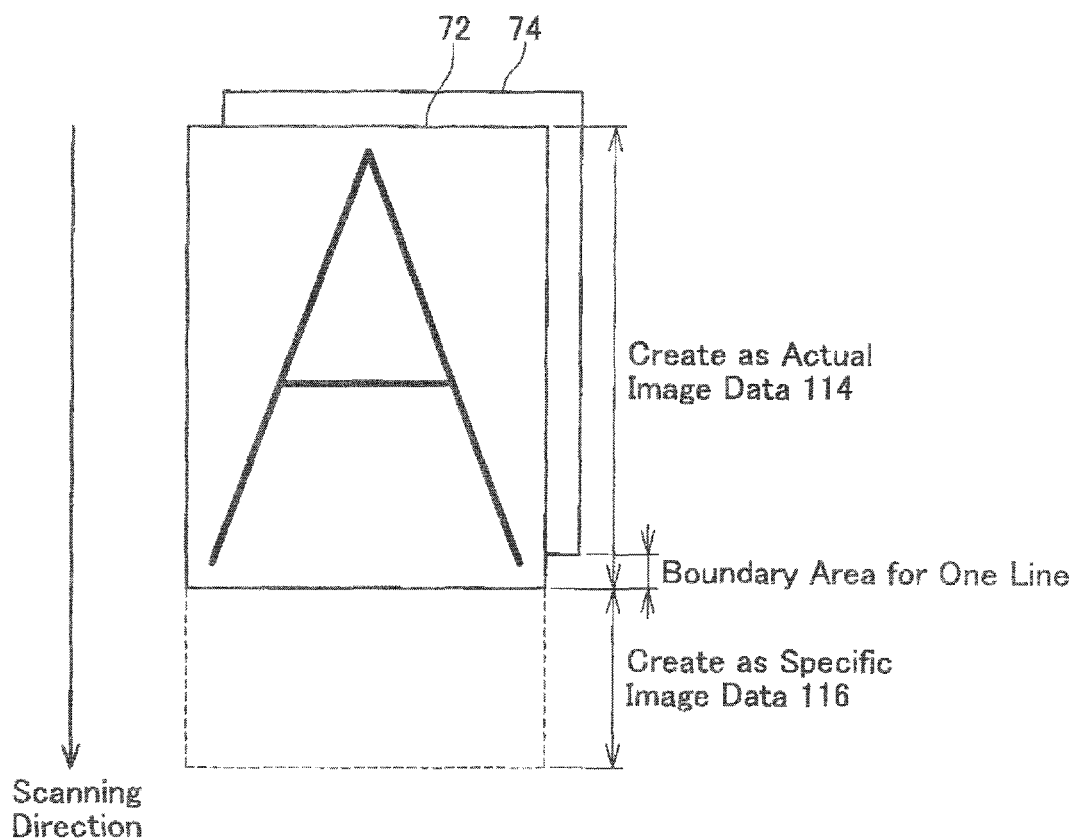
FIG. 2 schematically shows original documents to be scanned.

FIG. 2 schematically shows the two original documents 72, 74. When the user wishes to perform the moving scan, the user places the original document 72 on the transparent plate and inputs an instruction to perform the scanning to the operation unit 12. In this case, the scanning mechanism moves in the second direction (the scanning direction in FIG. 2) to scan the original document 72. Next, the user removes the original document 72 from the transparent plate, places the original document 74 on the transparent plate, and inputs an instruction to perform the scanning to the operation unit 12. In this case, the scanning mechanism scans the original document 74. When the user inputs an instruction to end the scanning to the operation input 12, PDF (Portable Document Format) data (i.e., PDF file) for two pages which represents the two pieces of original documents 72, 74 is created.

When the user wishes to perform the aforementioned stationary scan, the user places the original documents 72, 74 on the auto document feeder and inputs the instruction to perform the scanning to the operation unit 12. In this case, the auto document feeder first feeds the original document 72 in the second direction (the direction opposite to the scanning direction in FIG. 2), and the scanning mechanism scans the original document 72. The auto document feeder then feeds the original document 74, and the scanning mechanism scans the original document 74. In this case, PDF data (i.e., PDF file) for two pages which represents the two pieces of the original documents 72, 74 are created.

(Configuration of a PDF File Created by the Control Unit 20)

Figure 3:
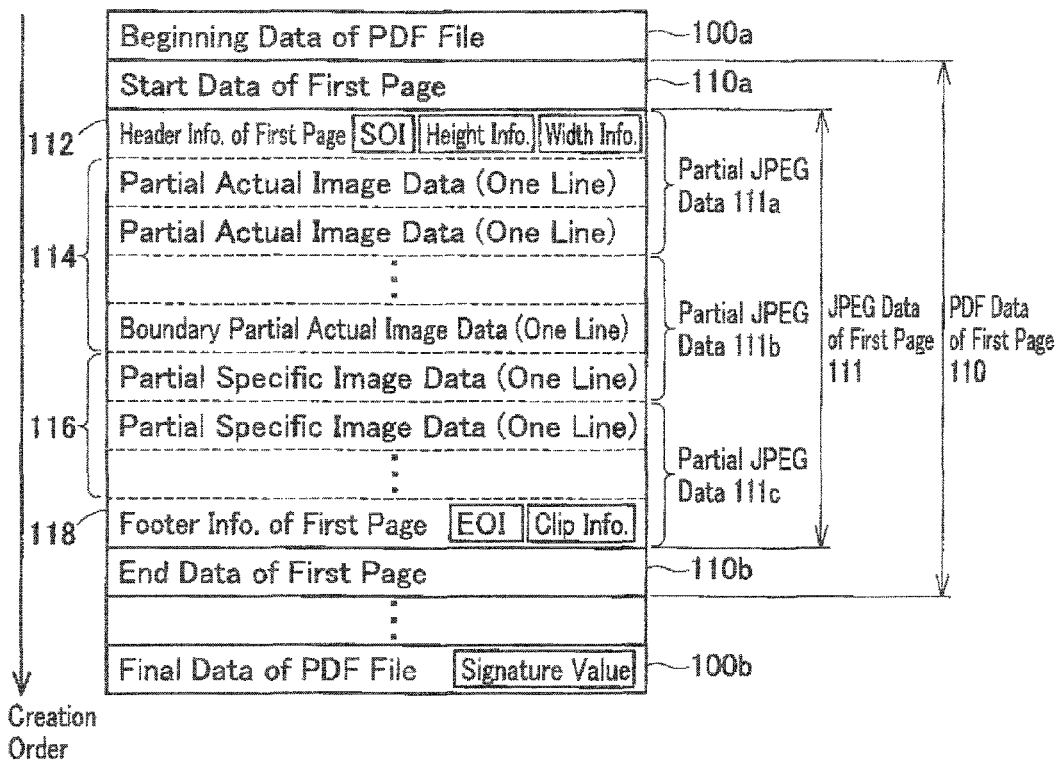
FIG. 3 shows a configuration of a PDF file.

The control unit 20 of the multi-function device 10 creates JPEG data representing a scanned scan target object (e.g., paper media such as the original documents 72, 74), creates a hash value using the JPEG data, and creates a PDF file in the USB memory 8 by using the JPEG data and the hash value. Note that the control unit 20 creates PDF file for M pages when M pieces of scan target objects are scanned (M is an integer equal to one or more). As shown in FIG. 3, a PDF file 100 includes beginning data 100a, final data 100b, and PDF data 110 for one or more pages. The beginning data 100a includes a PDF header. The final data 100b includes a PDF footer, a signature value created in S34 shown in FIG. 4 as will be described hereinafter, and a certificate that is preinstalled in the multi-function device 10. The certificate includes certificate information on the certificate and a public key for decoding the signature value. The certificate information includes information indicating an issuer (certificate authority (CA)) of the certificate, information indicating a destination to which the certificate is issued (i.e., the multi-function device 10) of the certificate, and information indicating the date and time of issuance of the certificate.

The PDF data 110 of a first page includes a start data 110a of the first page, JPEG data 111, and end data 110b of the first page. The start data 110a includes a character string that indicates the start of the PDF data 110 of the first page. The end data 110b includes a character string indicating the end of the PDF data 110 of the first page The JPEG data 111 is data in JPEG format that represents the scan target object 72. Note that the JPEG data 111 does not have a concept of page. However, JPEG data 111 included in the PDF data 110 of the first page is often referred to as "JPEG data 111 of the first page," hereinafter. The scan target objects 72, 74 also do not have the concept of page, but the scan target object 72 represented by the PDF data 110 of the first page is often referred to as "the scan target object 72 of the first page." Similarly, the scan target object 74 is referred to as "the scan target object 74 of the second page." Although FIG. 3 does not show the PDF data of the second page and the subsequent pages, the PDF data of the second page and the subsequent pages have the same configuration as that of the PDF data 110 of the first page.

The JPEG data 111 of the first page includes header information 112 of the first page, actual image data 114, specific image data 116, and footer information 118 of the first page.

Note that a set of the actual image 114 and the specific image data 116 is often referred to as "entire image data," hereinafter.

The header information 112 is created prior to the actual image data 114. In other words, the header information 112 is disposed in the JPEG data 111 prior to the actual image data 114. The header information 112 includes an SOI (Start of Image) marker, height information, and width information. In the following descriptions, the height information and width information are used for expressing the height and width of image data. The height of the image data represents the number of pixels corresponding to the height direction of the image data, and the width represents the number of pixels corresponding to the width direction of the image data. The height information and the width information included in the header information 112 indicate the height and the width of the entire image data 114, 116. Note that a value represented by the width information included in the header information 112 is identical to the actual width of the actual image data 114. A value represented by the height information included in the header information 112, however, might not be identical to the actual height of the actual image data 114. Specifically, although described later in detail, in a case where the specific image data 116 is created (when a result of S26 shown in FIG. 4 described later is NO), the value represented by the height information included in the header information 112 is not identical to the actual height of the actual image data 114 but is identical to the height of the entire image data that include the actual image data 114 and the specific image data 116. In a case where the specific image data 116 is not created (when the result of S26 shown in FIG. 4 is YES), the value represented by the height information included in the header information 112 is identical to the actual height of the actual image data 114.

The greater the width of the scan target object 72 (i.e., the length in the first direction), the greater the width of the actual image data 114. In addition, the higher the scanning resolution in the width direction, the greater the width of the actual image data 114. The greater the height of the scan target object 72 (i.e., the length in the second direction (scanning direction)), the greater the height of the actual image data 114. The higher the scanning resolution in the height direction, the greater the height of the actual image data 114.

The actual image data 114 is image data representing the scan target object 72 of the first page (bitmap data, in the present embodiment). The actual image data 114 are compressed and included in the JPEG data 111. The actual image data 114 is configured by a plurality of partial actual image data. One of the partial actual image data is created out of scan data for one line. Note that "scan data for one line" is scan data corresponding to one pixel in the height direction. Thus, when, for example, the scanning resolution in the width direction that is designated by the user is a maximum scanning resolution, the "scan data for one line" has the number of pixels that is the same as the number of a plurality of image sensors of the scanning mechanism.

Figure 4:
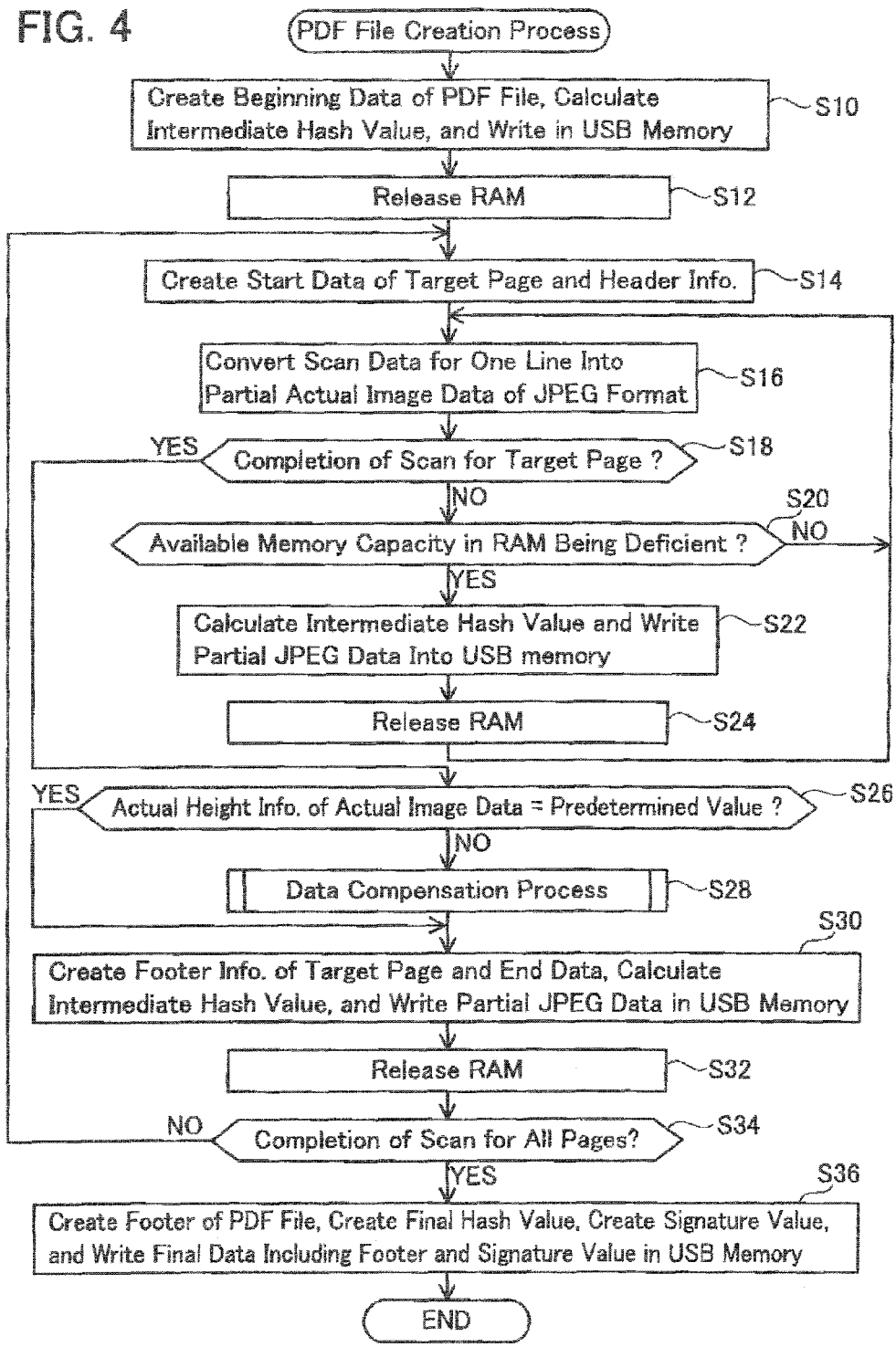
FIG. 4 shows a flowchart of a PDF file creation process.

The specific image data 116 is not image data representing the scan target object 72 of the first page but image data compensated in S28 shown in FIG. 4. Note that the specific image data is compressed and included in the JPEG data 111. The specific image data 116 is configured by a plurality of partial specific image data. One of the partial specific image data has the same number of pixels as the partial actual image data created out of the scan data for one line.

The footer information 118 is created after the actual image data 114 (and the specific image data 116) is created. In other words, the footer information 118 is disposed in the JPEG data 111 after the actual image 114 (and the specific image data 116) are disposed. The footer information 118 includes an EOI (End of Image) marker. Note that each data between the SOI marker and the EOI marker is often called "segment." Therefore, the entire image data 114, 116 can be referred to as "segment." In FIG. 3, the footer information 118 includes clip information, which is utilized in a second embodiment described hereinafter. In the present embodiment the footer information 118 may not include the clip information.

The JPEG data 111 of the first page is configured by a plurality of partial JPEG data 111a, 111b. The types of data included in one of the partial JPEG data are not necessarily determined in advance. Although described later in detail, when it is determined in S20 shown in FIG. 4 and S56 or S66 shown in FIG. 5 that the RAM 26 lacks the available capacity, the creation of one partial JPEG data is ended (i.e., one partial JPEG data is determined). Note that the JPEG data of the second page and the subsequent pages (not shown) have the same configuration as that of the JPEG data 111 of the first page.

(Processes Performed by the Multi-Function Device 10)

Next are described contents of processes for creating the PDF file 100 within the USB memory 8. Once the user performs a predetermined operation, the control unit 20 performs a PDF file creation process shown in FIG. 4. The predetermined operation mentioned above includes mounting the USB memory 8 to the USB interface 16, placing the scan target objects on the transparent plate or the auto document feeder, designating a desired scanning resolution, and operating a scan performing key included in the operation unit 12.

As shown in S10 in FIG. 4, the purpose data creation unit 50 (see FIG. 1), first, creates the beginning data 100a of the PDF file 100 (see FIG. 3) in the RAM 26. Further, in S10, the calculation unit 52 (see FIG. 1) calculates a hash value by using the beginning data 100a within the RAM 26. Note in the present embodiment that the calculation unit 52 utilizes an SHA (Secure Hash Algorithm)-1 as a hash function, but may also utilize MD4, MD5 or other hash functions. In addition, hereinafter, a hash value that is calculated finally in S36 of FIG. 4 is called "final hash value," and the hash values that are calculated in the processes prior to the process of S36 in order to create the final hash value are called "intermediate hash values." In addition, a writing unit 54 (see FIG. 1) writes the beginning data 100a of the RAM 26 into the USB memory 8.

Once the beginning data 100a is written to the USB memory 8 in S10, the purpose data creation unit 50 deletes the beginning data 100a from the RAM 26 (releases the RAM 26) in S12. Note that, in S12, the intermediate hash value calculated in S10 is not deleted from the RAM 26. In the following descriptions as well, the intermediate hash value is not deleted from the RAM 26 in each of the processes (e.g., S22 and the like) performed for releasing the RAM 26.

Subsequently, although not shown, in S14 the original data creation unit 30 causes the scan performing unit 70 to scan the scan target object 72, which is a target page. The target page is the first page in the first S14. The following describes contents of processes S14 to S30 as an example where the target page is the first page. The scan performing unit 70 scans the scan target object 72 of the first page. Note that the scan performing unit 70 has a buffer (not shown) for temporarily storing scan data in RGB bitmap format that are obtained by scanning the scan target object. The buffer has a storage capacity for storing scan data for one line.

Although not shown, prior to a process subsequent to the process of S14, the original data creation unit 30 secures in the RAM 26 a storage area that has the storage capacity for storing the scan data for one line ("line storage area," hereinafter). The scan data for one line within the buffer of the scan performing unit 70 is written to the line storage area within the RAM 26. As a result, the buffer can be released and scan data for a subsequent line can be stored in the buffer. Once the scan data for one line is stored in the line storage area, the process subsequent to the process of S14 is started.

In S14, the purpose data creation unit 50 creates the start data 110*a* of the first page (see FIG. 3) in the RAM 26. Furthermore, in S14, the header information creation unit 32 (see FIG. 1) creates the header information 112 of the first page (see FIG. 3) in the RAM 26. More specifically, the header information creation unit 32 creates the SOI marker, predetermined height information and actual width information, in the RAM 26. The predetermined height information and the actual width information are described hereinafter in detail.

Figure 6:
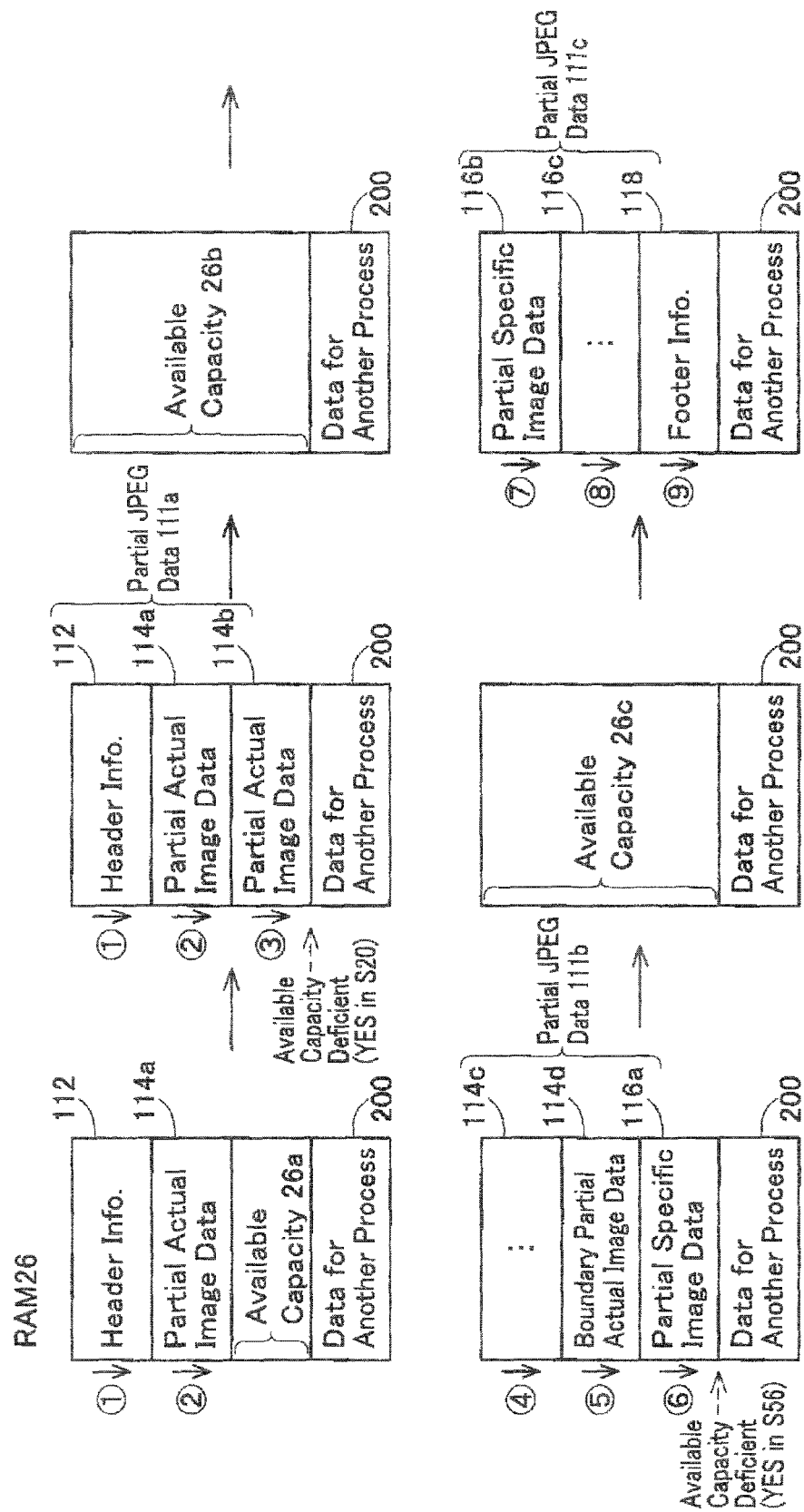
FIG. 6 shows how stored contents of a RAM change.

Since the scanning of the scan target object 72 of the first page is not yet ended at this point in S14, the actual height of the actual image data 114 is unknown. Therefore, the header information creation unit 32 creates the predetermined height information in the RAM 26. In the present embodiment, the predetermined information indicates the height ("maximum height," hereinafter) of actual image data that is created by the scan performing unit 70 scanning one piece of scan target object at a maximum possible scanning resolution, the scan target object having maximum height and width in which the scan performing unit 70 can scan. Note that the header information creation unit 32 further acquires the actual width of the actual image data 114 by reference to the number of pixels of the scan data for one line that is stored in the line storage area. The header information creation unit 32 further creates the width information indicating the actual width of the actual image data 114, in the RAM 26. In this manner, the header information 112 including the SOT marker, the predetermined height information and the width information is stored in the RAM 26, as shown in FIG. 6.

Next, in S16 the actual image data creation unit 34 (see FIG. 1) converts the scan data for one line that is stored in the line storage area, into JPEG image data. As a result, partial actual image data 114*a* for one line (i.e., one partial actual image data 114*a*) that is created from the scan data for one line is stored in an available capacity 26*a* of the RAM 26, as shown in FIG. 6. Although not shown, once the process of S16 is performed, the original data creation unit 30 deletes the scan data for one line that is stored in the line storage area (i.e., releases the line storage area). As a result, the line storage area can store scan data for a subsequent line.

Next, in S18 the original data creation unit 30 determines whether the scanning of the scan target object 72 of the first page is ended or not. The scan data for the last line representing the scan target object 72 of the first page includes information indicating the last part of the page. When the process of S16 is performed on the scan data for one line having such information, the original data creation unit 30 determines the result of S18 as YES, and proceeds to S26.

When, on the other hand, the result of S18 is NO, a monitoring unit 38 (see FIG. 1) determines, in S20, whether the available capacity in the RAM 26 is deficient or not. More specifically, the monitoring unit 38 determines whether the capacity of an unused area (i.e., the available capacity) within the RAM 26 is larger than a predetermined size (e.g., zero). A situation in which the available capacity in the RAM 26 is deficient is described next.

As described earlier, the RAM 26 has a storage capacity larger than a storage capacity for storing JPEG data for one page having the maximum data size. Therefore, in a condition in which the control unit 20 performs only the PDF file creation process shown in FIG. 4, normally the RAM 26 has sufficient available capacity. Thus, the result of S20 shown in FIG. 4 is constantly determined as NO until the scanning of the scan target object 72 of the first page is ended. Therefore, all JPEG data representing the scan target object 72 of the first page are written to the RAM 26. However, for example, there is a possibility that print data is transmitted from the PC 6 to the multi-function device 10 while the PDF file creation process shown in FIG. 4 is performed. In this case, the control unit 20 performs a print process, not shown, simultaneously with the PDF file creation process shown in FIG. 4 (in parallel with the PDF file creation process).

In the print process, the control unit 20 writes the print data to the RAM 26. Accordingly, data 200 (print data) used for other process is written to the RAM 26, as shown in FIG. 6. As a result, the available capacity of the RAM 26 becomes low, and it can be determined, in of S20 shown in FIG. 4, that the available capacity in the RAM 26 is deficient.

The situation in which the available capacity in the RAM 26 is deficient occurs not only when the control unit 20 performs the print process, but also when the control unit 20 performs a process other than the print process. For instance, the control unit 20 creates data representing a WEB page, in response to an access from the PC 6, and then performs a process for transmitting the data to the PC 6. In other words, the available capacity in the RAM 26 may be deficient when the control unit 20 performs a specific process other than the PDF file creation process shown in FIG. 4 (the print process, a WEB page creation process, etc.)

When the available capacity in the RAM 26 is not deficient (NO in S20 of FIG. 4), the actual image data creation unit 34 returns to S16 to create the partial actual image data for one line in the RAM 26 by using the scan data for the subsequent line that is stored in the line storage area. The process of S16 is repeatedly performed until the available capacity of the RAM 26 becomes deficient (until the result of S20 is determined as YES), whereby the partial actual image data 114*a*, 114*b* are stored in the RAM 26, as shown in FIG. 6.

When the available capacity in the RAM 26 is deficient (YES in S20), the original data creation unit 30 ends the creation of one partial JPEG data 111*a* (see FIG. 6) and proceeds to S22. With the configuration in which the creation of the one partial JPEG data 111*a* is ended when the RAM 26 lacks the available capacity, one large partial JPEG data can be created, as compared to a specific configuration in which the creation of one partial JPEG data is ended when a predefined size of JPEG data is created. Thus, according to the present embodiment, the number of times the processes of S22 and S24 shown in FIG. 4 are performed can be reduced, as compared to the specific configuration described above.

In S22, the calculation unit 52 calculates a new intermediate hash value by using the intermediate hash value within the RAM 26, which was calculated in S10 shown in FIG. 4, the start data 110*a* of the first page within the RAM 26, and the one partial JPEG data 111*a* within the RAM 26 (i.e., the header information 112 and one or more partial actual image data 114*a*, 114*b*). As a result, the intermediate hash value from the top of the beginning data 100*a* to the end of the partial JPEG data 111*a* (i.e., the end of the partial actual image data 114*b*) are calculated. Note that the calculation unit 52 calculates the intermediate hash value by sequentially using the data in the same order as the order of creating the data 110*a*, 112, 114*a* and 114*b* within the RAM 26. Therefore, the calculation unit 52 calculates the intermediate hash value by using the header information 112 prior to the partial actual image data 114*a*, 114*b*. In the following descriptions as well, the calculation unit 52 sequentially calculates the intermediate hash value by sequentially using the data in the same order as the order of creating the data. In the second and subsequent processes of S22, the calculation 52 calculates a new intermediate hash value by using intermediate hash value calculated in the previous S22 and the one partial JPEG data within the RAM 26. In addition, in S22 the writing unit 54 writes the one partial JPEG data 111a of the RAM 26 into the USB memory 8.

When the partial JPEG data 111a is written to the USB memory 8 in S22, the original data creation unit 30 deletes the partial JPEG data 111a from the RAM 26 in S24 (i.e., releases the RAM 26). As a result, an available capacity 26b is formed in the RAM 26, as shown in FIG. 6.

Next, the original data creation unit 30 performs the processes subsequent to the process of S16 again. As a result, one or more partial actual image data 114c, 114d are stored in the RAM 26, as shown in FIG. 6. Hereinafter, one partial actual image data 114d that is created out of the scan data for the last line representing the scan target object 72 of the first page is called "boundary partial actual image data 114d."

When the boundary partial actual image data 114d is created in the RAM 26, the result of S18 is determined as YES, and the process proceeds to S26. In S26, the original data creation unit 30 determines whether the actual height of the actual image data 114 representing the scan target object 72 of the first page is identical to the value indicated by the predetermined height information (the height information created in S14). After the header information 112 of the first page is created in S14, the original data creation unit 30 counts the number of times the conversion process of S16 has been performed. The number of pixels, same as the number of times the conversion process of S16 is performed, indicates the actual height of the actual image data 114. The original data creation unit 30 determines whether the number of times the conversion process of S16 has been performed is identical to the value indicated by the predetermined height information, and accordingly determines the result of S26. As described above, in the present embodiment the actual height of the actual image data 114 is not greater than the value indicated by the predetermined height information; and this is due to the predetermined height information showing the maximum height.

When the actual height of the actual image data 114 is smaller than the value indicated by the predetermined height information, the original data creation unit 30 determines that the result of S26 is NO, and performs a data compensation process in S28. When, on the other hand, the actual height of the actual image data is identical to the value indicated by the predetermined height information, the original data creation unit 30 skips S28 and proceeds to S30.

(Data Compensation Process)

Contents of the data compensation process of S28 are described with reference to FIG. 5. In S50 a specific image data creation unit 36 (see FIG. 1) determines whether all of the pixels configuring the boundary partial actual image data 114d (see FIG. 6) show a white color or not. For instance, in a case of 256 gradations, the pixels where all of R, G and B values indicate 255 are white pixels. Therefore, the specific image data creation unit 36 determines the result of S50 as YES when all of the RGB values of the pixels configuring the boundary partial actual image data 114d indicate 255. When any of the RGB values of at least one of the pixels configuring the boundary partial actual image data 114d is a value other than 255, the specific image data creation unit 36 determines the result of S50 as NO.

When the result of S50 is YES, in S52 the specific image data creation unit 36 creates JPEG partial specific image data for one line (i.e., one partial specific image data) configured by pixels showing a predetermined color other than white (e.g., black). The specific image data creation unit 36 performs the creation process of S52 so that the number of pixels in the width direction of the actual image data 114 is identical to the number of pixels in the width direction of the partial specific image data.

Next, in S54 the original data creation unit 30 determines whether the actual height of the entire image data (the set of the actual image data 114 and the specific image data 116) of the first page is identical to the value indicated by the predetermined height information (the height information created in S14). After the data compensation process is started, the original data creation unit 30 counts the number of times the conversion process of S52 is performed. The number of pixels, which is same as the sum of the number of times the conversion process of S16 shown in FIG. 4 is performed and the number of times the conversion process of S52 is performed, is the actual height of the entire image data 114, 116. The original data creation unit 30 determines the result of S54 by determining whether this sum is identical to the value indicated by the predetermined height information.

When the result of S54 is NO, in S56 the monitoring unit 38 determines whether the available capacity in the RAM 26 is deficient. More specifically, the monitoring unit 38 determines whether the available capacity of the RAM 26 is larger than a predetermined size (e.g., a size for storing the footer information 118 and the end data 110b, as described hereinafter). When the available capacity in the RAM 26 is not deficient (NO in S56), the specific image data creation unit 36 repeatedly performs the process of S52 until the available capacity of the RAM 26 becomes deficient (until the result of S56 is determined as YES). Accordingly, each partial specific image data 116a is stored in the RAM 26, as shown in FIG. 6.

When the available capacity in the RAM 26 is deficient (YES in S56), the original data creation unit 30 ends the creation of the one partial JPEG data 111b (see FIG. 6), and proceeds to S58. In S58 the calculation unit 52 calculates a new intermediate hash value by using the intermediate hash value of the RAM 26 calculated in S22 shown in FIG. 4 (the last S22) and the one partial JPEG data 111b of the RAM 26 (i.e., one or more partial actual image data 114c, 114d, one or more partial specific image data 116a) As a result, the intermediate hash value from the top of the beginning data 100a to the end of the partial JPEG data 111b (i.e., the end of the partial specific image data 116a) are calculated. In a process of S58 performed subsequent to the second S58, the calculation unit 52 calculates a new intermediate hash value by using the intermediate hash value calculated in the previous S58 and the one partial JPEG data within the RAM 26. Moreover, in S58 the writing unit 54 writes the one partial JPEG data 111b of the RAM 26 into the USB memory 8.

Once the partial JPEG data 111b is written into the USB memory 8 in S58, the original data creation unit 30 deletes the partial JPEG data 111b from the RAM 26 in S60 (i.e., releases the RAM 26). As a result, an available capacity 26c is formed in the RAM 26, as shown in FIG. 6.

Next, the original data creation unit 30 performs the processes following S52 again, until the result of S54 is determined as YES. As a result, one or more partial specific image data 116b, 116c are stored in the RAM 26, as shown in FIG. 6. In other words, in the present embodiment, the actual image data 114 is compensated by the specific actual image data 116. When the result of S54 is YES, the original data creation unit 30 ends the data compensation process and proceeds to S30 shown in FIG. 4.

Note that when the result of S50 is NO (when at least one of the pixels configuring the boundary partial actual image data 114d shows a color other than white), the original data creation unit 30 performs the processes of S62 to S70. In S62, the specific image data creation unit 36 creates partial specific image data for one line configured by the pixels showing white. Except for the fact that the pixels show white, the process of S62 is same as the process of S52. Because the processes of S64 to S70 are the same as the processes of S54 to S60, the explanations of the processes of S64 to S70 are omitted.

(Processes Following the Data Compensation Process)

In S30 shown in FIG. 4, a footer information creation unit 40 (see FIG. 1) creates the footer information 118 (see FIG. 3) of the first page in the RAM 26. Consequently, the footer information 118 is stored in the RAM 26, as shown in FIG. 6. As a result, one partial JPEG data 111c is created in the RAM 26. Furthermore, in S30 the purpose data creation unit 50 creates end data 110b (see FIG. 3) of the first page in the RAM 26. Moreover, in S30, the calculation unit 52 calculates a new intermediate hash value by using a previous intermediate hash value that had been calculated just before the oncoming calculation, the one partial JPEG data 111c within the RAM 26 (i.e., one or more partial specific image data 116b, 116c, and the footer information 118), and the end data 110b of the first page within the RAM 26. When the result of S26 shown in FIG. 4 is YES, "the previous intermediate hash value" is the intermediate hash value calculated in the last processing of S22 shown in FIG. 4. In addition, when the result of S26 shown in FIG. 4 is NO, "the previous intermediate hash value" is the intermediate hash value calculated in the last S58 or S68 shown in FIG. 5. In S30 the writing unit 54 writes the partial JPEG data 111c and the end data 110b of the first page within the RAM 26, into the USB memory 8.

Next, in S32 the original data creation unit 30 deletes the partial JPEG data 111c and the end data 110b of the first page from the RAM 26 (i.e., releases the RAM 26). Subsequently, in S34 the purpose data creation unit 50 determines whether the scanning of the scan target objects of all of the pages is finished or not. More specifically, when scan data for a new line is stored in the line storage area of the RAM 26, the purpose data creation unit 50 determines the result of S34 as NO. When the scan data for the new line is not stored in the line storage, the purpose data creation unit 50 determines the result of S34 as YES.

When the result of S34 is NO, the purpose data creation unit 50 performs the processes S14 to S30 again for a second round, with the target page being the second page. The second-round processes of S14 to S30 are the same as the processes of S14 to S30 of a first round. As a result of the second-round processes of S14 to S30, PDF data of the second page (not shown) that representing the scan target object 74 shown in FIG. 2 is written to the USB memory 8. In addition, an intermediate hash value from the top of the beginning data 100a to the end of the end data of the second page (not shown) is calculated. In the present embodiment, the result of S34 is determined as YES when PDF data for the two pages and representing the two pieces of the scan target objects 72, 74 is created.

When the result of S34 is YES, in S36 the purpose data creation unit 50 creates the PDF footer in the RAM 26. In S26 the calculation unit 52 calculates a final hash value by using the intermediate hash value calculated in the last S30 (e.g., the second S30 when there are two pieces of scan target objects), and the PDF footer. As a result, the final hash value from the top of the beginning data 100a to the end of the PDF footer is calculated. In addition, in S36 the signature value creation unit 56 (see FIG. 1) creates a signature value (i.e., hash value with a signature) by encoding the final hash value using a predetermined secret key. In addition, in S36 the purpose data creation unit 50 creates the final data 100b (see FIG. 3) including the PDF footer, the signature value, and the predetermined certificate, in the RAM 26. The signature value and the certificate are not the targets used for calculating the final hash value. In S36, the writing unit 54 writes the final data 100b to the USB memory 8. Accordingly, the PDF file 100 shown in FIG. 3 is completed in the USB memory 8.

(Processes Performed by an External Device)

The user can carry the USB memory 8 that includes the PDF file 100. For example, the user can display the PDF file 100 of the USB memory 8 on a display unit of the PC 6 (an example of the external device) by mounting the USB memory 8 to a USB interface of the PC 6. In so doing, the PC 6 displays an image of the first page representing the scan target object 72 of the first page, in accordance with the entire image data (the actual image data 114 and the specific image data 116) of the first page that is included in the PDF file 100. Note that because the specific image data 116 is unrelated to the scan target object 72 of the first page, the image of the first page includes a partial image unrelated to the scan target object 72 of the first page (an image represented by the specific image data 116).

However, as described above, when a boundary part of the scan target object 72 of the first page ("a boundary area for one line" shown in FIG. 2) is white (YES in S50 shown in FIG. 5), the specific image data 116 is configured by pixels showing the predetermined color other than white. Because it is highly likely that the boundary part of the scan target object 72 is white (such as a margin of an original document), S50 shown in FIG. 5 determines whether the edge part is white or not. When the boundary part of the scan target object 72 of the first page includes a color other than white (NO in S50 shown in FIG. 5), the specific image data 116 is configured by pixels showing white. Therefore, the user can easily find a boundary between the partial image representing the scan target object 72 of the first page and the partial image unrelated to the scan target object 72 of the first page. As with the image of the first page, the PC 6 displays an image of the second page representing the scan target object 74 of the second page, in accordance with the entire image data of the second page that is included in the PDF file 100.

Note that the user can cause other printing device (an example of the external device) to print out the PDF file 100 stored in the USB memory 8, by mounting the USB memory 8 to a USB interface of this printing device.

The external device can calculate a hash value from the top of the beginning data 100a to the end of the PDF footer of the final data 100b ("first hash values" hereinafter). The external device can also create a hash value by decoding the signature value included in the final data 100b by using the public key included in the final data 100b ("second hash value" hereinafter). The external device can also compare the first hash value with the second hash value to determine whether there is a possibility that the PDF file 100 is altered. For instance, when the first hash value is not identical to the second hash value, the external device outputs (displays, prints out, etc.) a message that explains that the PDF file 100 is likely to have been altered. The user can view this message to find out that the PDF file 100 is likely to be altered.

The communication system 2 of the embodiment is described above in detail. The actual height of the actual image data 114 representing one piece of the scan target object 72 is unknown until the scanning of the one piece of the scan target object 72 is ended, or, in other words, until all the actual image data 114 is created. Therefore, when supposedly adopting a scanner device ("specific scanner device," hereinafter) for creating JPEG data that includes header information including the height information indicating the actual height of the actual image data 114, as well as the actual image data 114, a hash value calculation process using the header information cannot be performed until all the actual image data 114 are created. Moreover, since the header information is normally created prior to the actual image data 114, the abovementioned specific scanner device needs to perform the calculation process using the header information prior to the actual image data 114. Thus, the specific scanner device cannot perform the calculation process using the JPEG data including the header information and the actual image data 114, until all the actual image data 114 are created.

It should be noted that the specific scanner device can calculate the intermediate hash values using the JPEG data of the USB memory 8, by performing the process of writing the JPEG data into the USB memory 8. However, it takes a longer time to perform the process using the data of the USB memory 8, than performing the process using the data stored in the RAM 26. This is because the process for temporarily writing the data stored in the USB memory 8 into the RAM 26 needs to be performed in order to utilize the data stored in the USB memory 8, and it takes time to perform this process. Thus, in the present embodiment, the multi-function device 10 creates the JPEG data 111 in the RAM 26 and performs the calculation process using the JPEG data 111 within the RAM 26 (S22 and the like shown in FIG. 4).

However, the storage capacity of the RAM 26 of the multi-function device 10 is relatively small (smaller than those of the PC 6 and the like). For this reason, for example, in a situation where the print process is performed simultaneously with the calculation process as described above, the RAM 26 might be able to hold all the actual image data 114 simultaneously, or, in other words, the result of S20 shown in FIG. 4 is likely to be determined as YES. Therefore, the multi-function device 10 of the present embodiment creates the header information 112 including the predetermined height information instead of the height information indicating the actual height of the actual image data 114, and compensates the deficient portion with the specific image data 116 when the actual height of the actual image data 114 is smaller than the value indicated by the predetermined height information (when the result of S26 is NO). For this reason, the multi-function device 10 can perform the calculation process using one partial JPEG data, each time when the partial JPEG data 111*a* to 111*c* configuring the JPEG data 111 of the first page is created in the RAM 26. In other words, the multi-function device 10 can perform the calculation process using the header information 112 before all the actual image data 114 are created. Thus, the RAM 26 simply needs to hold one partial JPEG data instead of simultaneously holding all the JPEG data 111 representing one piece of the scan target object 72. In this case, the multi-function device 10 can rapidly calculate the final hash values even when the storage capacity of the RAM 26 is relatively low. As a result, the multi-function device 10 can rapidly create the PDF file 100 including the final hash values, in the USB memory 8.

The multi-function device 10 is an example of the "scanner device." The USB memory 8, the RAM 26, and the USB interface 16 are examples of the "external storage unit," the "internal storage unit," and the "unit to which the external storage unit is mounted," respectively. The JPEG data for two pages representing the two pieces of the scan target objects 72, 74 is an example of the "original data." For example, the JPEG data 111 of the first page representing the scan target object 72 is an example of the "target original data." The JPEG data 111 created when the result of S26 shown in FIG. 4 is NO is an example of the "first type of target original data." The three JPEG data 111*a* to 111*c* are examples of the "plurality of first partial data." The JPEG data (not shown) created when the result of S26 shown in FIG. 4 is YES is an example of "first type of the target original data." The plurality of partial JPEG data configuring this JPEG data is an example of the "plurality of second partial data." The specific image data created in S52 shown in FIG. 5 and the specific image data created in S62 shown in FIG. 5 are examples of the "first type of the specific image data" and the "second type of the specific image data," respectively.

Figure 5:
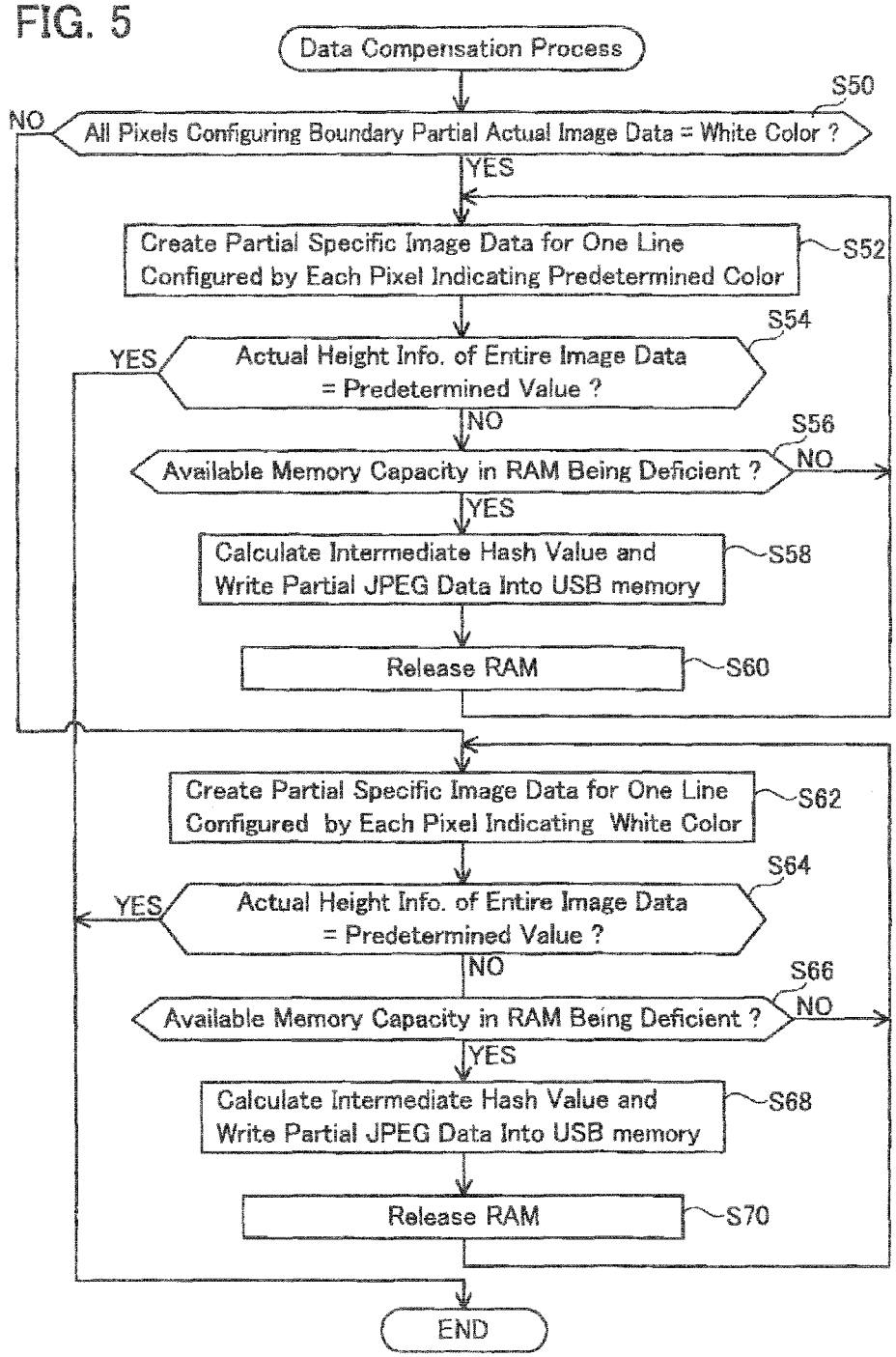
FIG. 5 shows a flowchart of a data compensation process.

The PDF file 100 expressing the two pieces of the scan target objects 72, 74 is an example of the "purpose data for M pages representing the M pieces of the scan target objects." The final hash value calculated in S36 shown in FIG. 4 is an example of the "digest value." The processes of S22 and S30 shown in FIG. 4 and the processes of S58 and S68 shown in FIG. 5 are each an example of the "calculation process." The height and width are examples of the "first type of size" and the "second type of size," respectively. The maximum height indicated by the predetermined height information is an example of the "first value." The actual width of the actual image data 114 is an example of the "second value."

Second Embodiment

The differences with the first embodiment are now described. In the second embodiment, the footer information 118 shown in FIG. 3 includes the clip information. The clip information includes actual height information and actual width information indicating the actual height and the actual width of the actual image data 114. In S30 shown in FIG. 4, the footer information creation unit 40 creates the footer information 118 including the clip information, in the RAM 26. According to this embodiment, when, for example, displaying the PDF file 100 of the USB memory 8 on the display unit of the PC 6, the external device can specify only the actual image data 114 from the entire image data 114, 116 by using the actual height information and the actual width information included in the clip information in the footer information 118. Therefore, the external device can display the image of the first page representing the scan target object 72 of the first page, in accordance with the actual image data 114 alone In this case, the image of the first page does not include the partial image unrelated to the scan target object 72 of the first page (the image represented by the specific image data 116).

Note in the present embodiment that the flowchart shown in FIG. 5 may be performed in order to perform the data compensation process of S28 shown in FIG. 4, but the processes of S62 to S70 shown in FIG. 5 may be omitted. In other words, only the processes of S52 to S60 may be performed in order to perform the data compensation process. In the present embodiment, the actual height information described above is an example of the "actual size information."

Modification 1

In each of the foregoing embodiments, the calculation unit 52 creates the "digest value" by utilizing a hashing method, but another digesting method may alternatively be utilized. Generally speaking, methods for calculating "digest values" include a variety of digesting methods for creating values that can be obtained from the original data representing the M pieces of scan target objects (the M is an integer equal to one or more), the values having data sizes smaller than a total data size of the original data.

Modification 2

In each of the foregoing embodiments, the purpose data creation unit 50 creates the "purpose data" in PDF format, but may instead create "purpose data" in a format other than PDF format (e.g., XPS format). In the embodiments described above, the original data creation unit 30 creates the "original data" in JPEG format, but may instead create "original data" in a format other than JPEG format (e.g., TIFF or BMP format). For instance, with a data format that can handle transparent information in PNG format, the transparent information can be used in data compensated by the data compensation process. In other words, without determining the value of each of the pixels configuring the boundary partial actual image data in the process shown in FIG. 5, all of the areas that need to be compensated may be compensated with the transparent information. In this case, even when the footer information does not include the clip information, the unrelated partial image is not displayed when the external device displays the PDF file.

Modification 3

In each of the foregoing embodiments, the USB memory 8 is used as the "external storage unit." However, the "external storage unit" may be a hard disk embedded in the multi-function device 10, or a medium mounted in the multi-function device 10, such as a CD, a DVD, or a floppy disk (registered trademark). The "external storage unit" may also be a storage unit of an external device (e.g., a server) that is configured separately from the multi-function device 10. In other words, the external storage unit may be a storage unit that has a larger storage capacity than the internal storage unit and is slower in being processed than the internal storage unit.

Modification 4

In each of the foregoing embodiments, in S22 and S30 shown in FIG. 4 and S58 and S68 shown in FIG. 5, the calculation unit 52 first calculates the intermediate hash values, and then the writing unit 54 writes the partial JPEG data into the USB memory 8. Instead, the writing process 54 may first write the partial JPEG data to the USB memory 8, and then the calculation unit 52 may calculate the intermediate hash values.

Modification 5

In each of the foregoing embodiments, when the available capacity in the RAM 26 is deficient (when the result of S20 shown in FIG. 4 is YES), the creation of the one partial JPEG data ends. Instead, the original data creation unit 30 may end the creation of the one JPEG data when data of a predetermined size is created.

Modification 6

In each of the foregoing embodiments, in S14 shown in FIG. 4 the header information creation unit 32 creates the header information 112 that includes the width information indicating the actual width of the actual image data 114. Instead, the header information creation unit 32 may create, for example, the header information 112 that includes predetermined width information indicating a value larger than the width of the actual image data that is created by scanning one piece of scan target object at a maximum scanning resolution, the scan target object having the maximum height and width in which the scan performing unit 70 can scan ("the largest scan target object," hereinafter). When the actual width of the actual image data 114 is not identical to the value indicated by the predetermined width information, the specific image data creation unit 36 may create the specific image data 116 so that the width of the entire image data 114, 116 is identical to the value indicated by the predetermined width information described above. The present embodiment also is included in the "scanner device" disclosed by the present application.

Modification 7

Note that the "first value" may be larger or smaller than the maximum height mentioned above. Particularly, when the "first value" is smaller than the maximum height mentioned above, the following configuration may be adopted. For example, when the scanning resolution designated by the user is lower than the maximum scanning resolution, the "first value" may be equivalent to the height of the actual image data that is created by scanning the largest scan target object at the designated scanning resolution. In addition, for example, an approximate size of the scan target object 72 may be designated by the user prior to actual scanning. In such a case, the "first value" may be equivalent to the height of the actual image data that is created by scanning a scan target object at the maximum scanning resolution (or at the designated scanning resolution), the scan target object having a size larger than the designated size but being smaller than the largest scan target object.

Modification 8

The multi-function device 10 may not create the PDF data. For example, the multi-function device 10 may save a combination of information on original data and a digest value in the USB memory 8, and the PC 6 may, for example, read the combination of information to create the PDF data. In other words, the processes of S10 and S36 shown in FIG. 4 may be performed by the multi-function device 10 and another device. Generally speaking, the "scanner device" may include at least the original data creation unit and the calculation unit.

Modification 9

In the foregoing embodiment, respective units 30 to 50 are realized as a result of the control unit 20 performing the processes according to the program. Nevertheless, at least one unit of respective units 30 to 50 may alternately be realized by a hardware resource such as a logic circuit.

What is claimed is:
1. A scanner device utilizing an external storage unit, the scanner device comprising:
an internal storage unit;
an original data creation unit configured to create original data representing M pieces of scan target objects in the internal storage unit in a case where the M pieces of the scan target objects are scanned, the M being an integer equal to one or more; and
a purpose data creation unit configured to calculate a digest value by utilizing the original data so as to create purpose data for M pages representing the M pieces of the scan target objects in the external storage unit by utilizing the original data and the digest value, wherein the original data creation unit comprises:

a header information creation unit configured to create header information in the internal storage unit in a case where target original data representing one piece of a scan target object included in the M pieces of the scan target objects is to be created, the header information including a predetermined first value as a first type of size information, the first type of size information indicating a first type of size which is a size of image data corresponding to a scanning direction;

an actual image data creation unit configured to create actual image data representing the one piece of the scan target object in the internal storage unit; and a specific image data creation unit configured to create specific image data in the internal storage unit in a first case where the first type of size of the actual image data is smaller than the first value such that the first type of size of entire image data including both of the actual image data and the specific image data is identical to the first value, wherein the purpose data creation unit comprises:

a calculation unit configured to perform, each time each of a plurality of first partial data is created in the internal storage unit, a calculation process for calculating the digest value by utilizing the first partial data in the first case, the plurality of first partial data constituting a first type of the target original data including the header information and the entire image data; and a writing unit configured to sequentially write each of the plurality of first partial data in the external storage unit in the first case.

2. The scanner device as in claim 1, wherein:

the original data creation unit further comprises:

a monitoring unit configured to monitor for a deficiency in an available memory capacity in the internal storage unit in a process of creating the target original data, wherein in the first case and in a case where the available memory capacity in the internal storage unit is deficient, the original data creation unit ends a creation of one first partial data.

3. The scanner device as in claim 1, wherein the first value is a value indicating a size equal to or larger than a size of maximum image data corresponding to the scanning direction, and the maximum image data is image data which is to be created in a case where one piece of a maximum scan target object is scanned, the maximum scan target object having the maximum size that the scanner device is capable of scanning.

4. The scanner device as in claim 1, wherein the original data creation unit further comprises:

a footer information creation unit configured to create footer information in the internal storage unit in the first case, the footer information including actual size information indicating the first type of size of the actual image data, the actual size information being information obtained based on an actual scan result of the one piece of the scan target object, wherein the first type of the target original data further includes the footer information in the first case.

5. The scanner device as in claim 1, wherein in the first case and in a case where all pixels constituting boundary image data indicate a white color, the specific image data creation unit creates a first type of the specific image data in the internal storage unit, the boundary image being a part of the actual image data and adjacent to a boundary between the actual image data and the specific image data, the first type of the specific image data being configured by each pixel indicating a predetermined color different from the white color, and in the first case and in a case where at least one pixel constituting the boundary image data indicates a color different from the white color, the specific image data creation unit creates a second type of the specific image data in the internal storage unit, the second type of the specific image data being configured by each pixel indicating the white color.

6. The scanner device as in claim 1, wherein the header information creation unit creates the header information further including a second value as a second type of size information in the internal storage unit, the second value being a value obtained based on an actual scan result of the one piece of the scan target object, the second type of size information indicating a second type of size which is size of image data corresponding to a direction perpendicular to the scanning direction.

7. The scanner device as in claim 1, wherein in a second case where the first type of size of the actual image data is identical to the first value, the specific image data creation unit does not create the specific data in the internal storage unit, the calculation unit further performs, each time each of a plurality of second partial data is created in the internal storage unit, the calculation process by utilizing the second partial data in the second case, the plurality of second partial data constituting a second type of the target original data including the header information and the actual image data, wherein the second type of the target original data does not include the specific image data, and the writing unit further sequentially writes each of the plurality of second partial data in the external storage unit in the second case.

8. The scanner device as in claim 1, wherein the purpose data creation unit further comprises:

a signature value creation unit configured to create a signature value by encrypting the digest value, wherein the purpose data creation unit creates the purpose data including the original data and the signature value in the external storage unit.

9. The scanner device as in claim 1, further comprising:

a unit to which the external storage unit is mounted.

10. A scanner device utilizing an external storage unit, the scanner device comprising:

an internal storage unit;

one or more processors; and a memory that stores a program including instructions to be executed by the one or more processors, wherein the instructions cause the one or more processors, when executed by the one or more processors, to function as:

an original data creation unit configured to create original data representing M pieces of scan target objects in the internal storage unit in a case where the M pieces of the scan target objects are scanned, the M being an integer equal to one or more; and a purpose data creation unit configured to calculate a digest value by utilizing the original data so as to create purpose data for M pages representing the M pieces of the scan target objects in the external storage unit by utilizing the original data and the digest value, wherein the original data creation unit comprises:

a header information creation unit configured to create header information in the internal storage unit in a case where target original data representing one piece of a scan target object included in the M pieces of the scan target objects is to be created, the header information including a predetermined first value as a first type of size information, the first type of size information indicating a first type of size which is a size of image data corresponding to a scanning direction;

an actual image data creation unit configured to create actual image data representing the one piece of the scan target object in the internal storage unit; and a specific image data creation unit configured to create specific image data in the internal storage unit in a first case where the first type of size of the actual image data is smaller than the first value such that the first type of size of entire image data including both of the actual image data and the specific data is identical to the first value, wherein the purpose data creation unit comprises:

a calculation unit configured to perform, each time each of a plurality of first partial data is created in the internal storage unit, a calculation process for calculating the digest value by utilizing the first partial data in the first case, the plurality of first partial data constituting a first type of the target original data including the header information and the entire image data; and a writing unit configured to sequentially write each of the plurality of first partial data in the external storage unit in the first case.

11. A scanner device comprising:

one or more processors; and a memory that stores a program including instructions to be executed by the one or more processors, wherein the instructions cause the one or more processors, when executed by the one or more processors, to function as:

an original data creation unit configured to create original data including header information and actual image data representing a scan target object in a case where the scan target object is scanned, the header information including a predetermined first value as a first type of size information, the first type of size information indicating a first type of size which is a size of image data corresponding to a scanning direction; and a calculation unit configured to sequentially perform a calculation process for calculating a digest value by sequentially utilizing each of a plurality of partial data constituting the original data, wherein in a case where the first type of size of the actual image data is smaller than the first value, the original data creation unit compensates the actual image data with specific image data such that the first type of size of compensated image data is identical to the first value so as to create the original data further including the specific image data.

* * * * *